United States Patent
Ueno (10) Patent No.: US 7,826,357 B2
(45) Date of Patent: Nov. 2, 2010

(54) MULTIPLEXING APPARATUS AND CELL DISCARD METHOD

(75) Inventor: Hiroshi Ueno, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 520 days.

(21) Appl. No.: 11/560,244

(22) Filed: Nov. 15, 2006

(65) Prior Publication Data

US 2007/0086467 A1 Apr. 19, 2007

Related U.S. Application Data

(63) Continuation of application No. 09/473,022, filed on Dec. 28, 1999, now Pat. No. 7,154,856.

(30) Foreign Application Priority Data

Dec. 28, 1998 (JP) ................... 10-374032

(51) Int. Cl.
*H04J 1/16* (2006.01)
*H04L 12/26* (2006.01)

(52) U.S. Cl. .................. 370/230; 370/230.1; 370/231; 370/235

(58) Field of Classification Search .............. None
See application file for complete search history.

(56) References Cited

U.S. PATENT DOCUMENTS

| | | | |
|---|---|---|---|
| 5,394,396 A | 2/1995 | Yoshimura et al. | |
| 5,440,547 A * | 8/1995 | Easki et al. | 370/395.3 |
| 5,570,361 A | 10/1996 | Norizuki et al. | 370/395.2 |
| 5,646,943 A * | 7/1997 | Elwalid | 370/230 |
| 5,949,757 A * | 9/1999 | Katoh et al. | 370/232 |
| 6,081,504 A | 6/2000 | Tanaka et al. | 370/230 |
| 6,122,252 A * | 9/2000 | Aimoto et al. | 370/235 |
| 6,163,528 A * | 12/2000 | Nagamoto | 370/236 |

FOREIGN PATENT DOCUMENTS

| | | |
|---|---|---|
| JP | 8-130543 | 5/1996 |
| JP | 8-237282 | 9/1996 |
| JP | 9-46344 | 9/1997 |
| JP | 9-261244 | 10/1997 |
| JP | 9-261245 | 10/1997 |
| JP | 10-13427 | 1/1998 |
| JP | 10-85252 | 3/1998 |

\* cited by examiner

*Primary Examiner*—Raj Jain
(74) *Attorney, Agent, or Firm*—Harrity & Harrity, LLP (57) ABSTRACT

An ATM multiplexing apparatus for selectively performing cell discard processing in the case of congestion, on the basis of a use state of the same connection formed by cells from the side of an ATM switching unit and subscribers without installing UPC units. The ATM multiplexing apparatus, which is connected to the ATM switching unit and plural subscribers though ATM communication lines, performs multiplex processing to ATM cells sent from the plural subscribers. The ATM multiplexing apparatus has a detection means for detecting a level of a congestion state corresponding to the ATM cells received from the subscribers and discard means for selectively discarding the ATM cells received from the subscribers on the basis of a communication state determined by the ATM cells received from the ATM switching unit, ATM cells received from the subscribers and a level value of a warning signal indicating the detected congestion state.

15 Claims, 11 Drawing Sheets

|  | Level Value | Updated Status Flag | Control |
|---|---|---|---|
| Decision 1 | × | DISCARDING & PTI = × × 0 | Discard |
| Decision 2 | 1 | SUSPEND & BOM | |
| | | SUSPEND & COM | |
| Decision 3 | 0 | ACTIVE & BOM | Pass |
| | | ACTIVE & COM | |

FIG.6a

|  | Level Value | Updated Status Flag | Control |
|---|---|---|---|
| Decision 1 | × × × | DISCARDING & PTI = × × 0 | Discard |
| Decision 2 | 001 | SUSPEND & BOM | |
| Decision 3 | 011 | SUSPEND & COM | |
| Decision 4 | 111 | ACTIVE & BOM | Pass |
| Decision 5 | 000 | ACTIVE & COM | |

| | Level Value 1 (129 − 1) | Level Value 2 (129 − 2) | Updated Status Flag | Control |
|---|---|---|---|---|
| Decision 1 | × | × | DISCARDING & PTI = × × 0 | Discard |
| Decision 2 | 1 | 1 | SUSPEND & BOM | Discard |
| | | | SUSPEND & COM | |
| Decision 3 | 0 | 1 | SUSPEND & BOM | Pass : To Storage Means 119-1 |
| | | | SUSPEND & COM | |
| Decision 4 | 1 | 0 | SUSPEND & BOM | Pass : To Storage Means 119-2 |
| | | | SUSPEND & COM | |
| Decision 5 | 0 | 0 | ACTIVE & BOM | Pass : To Storage Means 119-1 |
| | | | ACTIVE & COM | |

MULTIPLEXING APPARATUS AND CELL DISCARD METHOD

CROSS REFERENCE TO RELATED APPLICATIONS

This application is a continuation of U.S. patent application Ser. No. 09/473,022 filed Dec. 28, 1999, now U.S. Pat. No. 7,154,856, which claims priority from Japanese Patent Application No. 10-374032 filed Dec. 28, 1998, the contents of which are incorporated herein by reference.

BACKGROUND OF THE INVENTION

1. Field of the Invention

The present invention relates to an ATM (Asynchronous Transfer Mode) multiplexing apparatus, and particularly, to an ATM multiplexing apparatus for performing cell discard processing on the basis of a communication state of the connection between ATM cells from the side of an ATM switching unit and subscribers.

2. Description of Related Art

An ATM network communication system has become popular as service for integrally conducting data communication including voice and text data, further image data requiring high-speed transmission. In the ATM network communication system, cell discard processing is performed in order to protect an ATM transmission band from an ATM cell caused by abnormality etc. of subscriber terminals. The cell discard processing is carried out mainly by an ATM switching unit and an ATM multiplexing apparatus.

With regard to public known arts related to the present invention, technique on a control method of monitoring the packet flow rate is disclosed in Japanese Unexamined Patent Publication No. 46344 of 1997. This control method provides a plurality of usage parameter control mechanisms at the entrance of an ATM network. In each of the usage parameter control mechanism, the transfer rate defined in ABR (Available Bit Rate) communication service is set as a monitor parameter. Thus, monitor operations according to the use state of the ATM network are executed. Also, technique on an ATM communication network comprising ATM switching units connected in a multistage manner is disclosed in Japanese Unexamined Patent Publication No. 261244 of 1997. In this ATM communication network, if congestion has occurred in any of the ATM switching units, an ATM switch of the fore-stage of the ATM switching unit in which the congestion has occurred is notified of the congestion. The notified ATM switching unit controls the discard state of cells. Further, technique on a packet control switching unit and a cell transfer control method are disclosed in Japanese Unexamined Patent Publication No. 13427 of 1998. In this cell transfer control method, the ATM switching unit acting as a node unit stores priority on cell discard corresponding to a connection identifier. Cell discard processing is controlled on the basis of discard conditions determined by the relationship of the stored cell priority to the number of stack cells in the node every connection.

Figure 11:
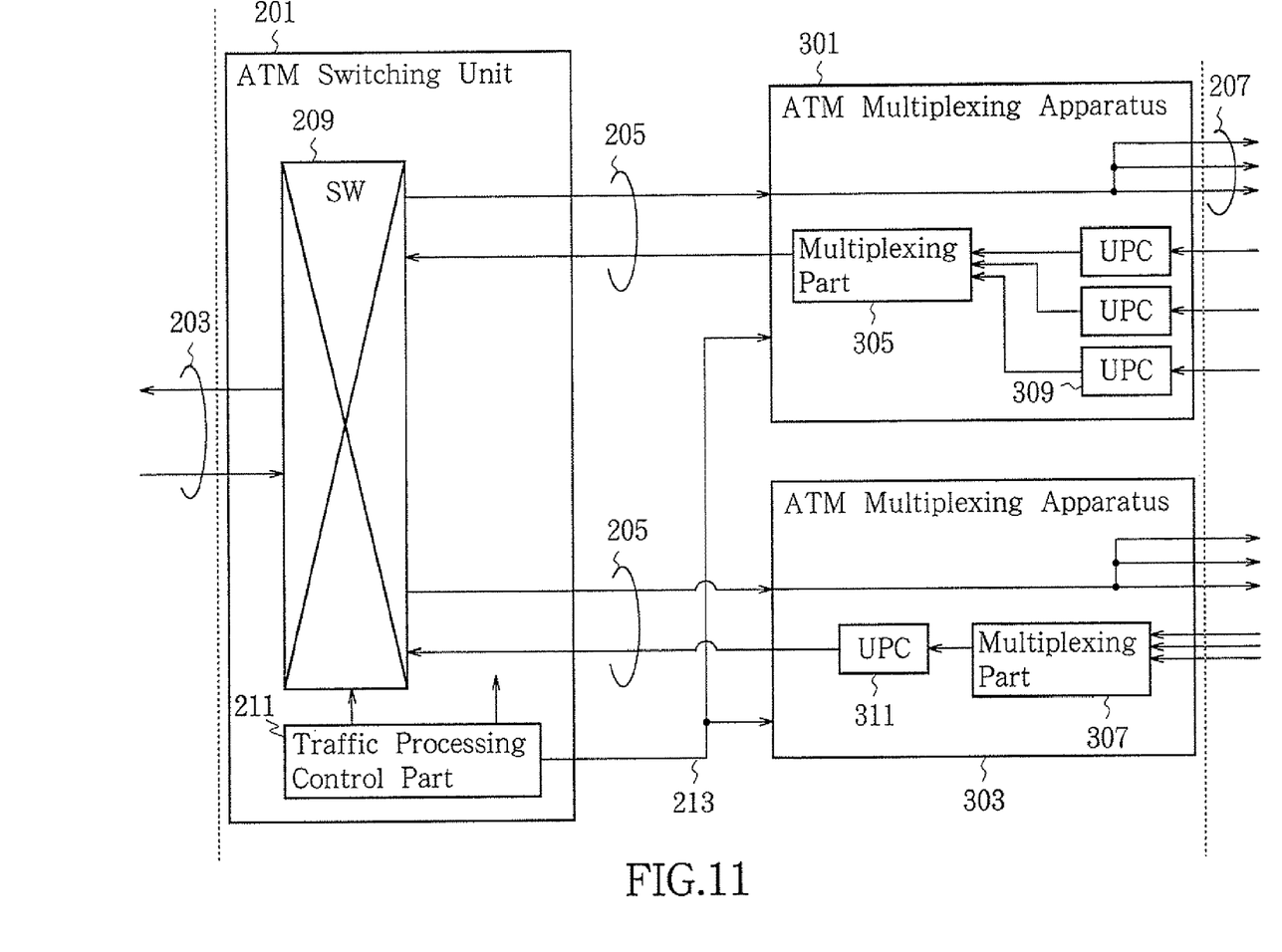
FIG. 11 is a block diagram illustrating a conventional ATM network communication system and ATM multiplexing apparatus.

FIG. 11 shows a conceptual diagram of a conventional ATM network system. An ATM switching unit 201 is installed in a central station. ATM multiplexing apparatus 301 and 303 are largely installed at remote sites nearest to subscribers. The ATM multiplexing apparatus 301 and 303 desirably have a cheap and simple configuration where possible.

Functions necessary for the ATM multiplexing apparatus 301 and 303 include a UPC (Usage Parameter Control) function. An object of the UPC function is to prevent congestion in an ATM network by checking whether the ATM cell flow from the subscribers violates a contract band or not. In order to efficiently share a band of an ATM transmission line with all the subscriber signals, the UPC to input signals of each subscriber line before multiplexing needs to be performed. However, installation of this UPC units 309 and 311 increases the cost per subscriber line. On the other hand, when SVC (Switched Virtual Connection) service for performing dynamic signal setting is adopted, traffic setting information set by signaling needs to be passed between the ATM switching unit and the ATM multiplexing apparatus. Passing of the traffic setting information can be managed by installation of a communication line for management, but the amount of processing of the ATM multiplexing apparatus increases.

In the conventional ATM network system as shown in FIG. 11, the ATM multiplexing apparatus 301 provides the UPC units 309 every subscriber line inside the units, so that the cost of installation increases. The UPC unit 311 is installed inside of the ATM multiplexing apparatus 303 to monitor a signal after multiplexing in a lump, so that the cost of installation of the UPC unit 311 decreases. Even in the case of installing any of the ATM multiplexing apparatus 301 and 303, traffic information from a traffic processing control part 211 is transferred from the ATM switching unit 201 to the ATM multiplexing apparatus 301 and 303 through traffic information transfer means 213. The traffic information transfer means 213 means communication between respective unit control parts. Coping with the traffic information transfer means 213 requires the increase in the cost of the ATM multiplexing apparatus 301 and 303.

Under such circumstances, the ATM multiplexing apparatus and the selective cell discard method for performing cell discard processing efficiently in the case of congestion on the basis of a use state of the connection formed by ATM cells received from the side of the ATM switching unit and ATM cells received from the side of the subscribers without installing the UPC units have been desired. It is desirable to detect a congestion state corresponding to the ATM cell flow sent from each subscriber. It is desirable to sequentially update the use state of the connection on the basis of available information on the ATM cells received from the ATM switching unit or the subscribers. The discard processing is desirably performed on the basis of a logical decision using a plurality of data providing the use state (communication state) of the connection and level information of the congestion state.

SUMMARY OF THE INVENTION

One aspect is directed to a multiplexing device comprising a discard control component configured to maintain communication state information that relates to a communication state for a switch and a subscriber and a detection component. The detection component includes a queue for storing data from the subscriber and a comparison component configured to obtain a congestion level corresponding to an amount of congestion of the queue. The discard control component selectively discards data received from the subscriber based on the congestion level and the communication state information.

Another aspect is directed to a method comprising receiving data sent from subscribers and detecting a congestion state of the received data from the subscribers; maintaining a communication state based on the received data from the subscribers and based on received data from a switching unit; and selectively performing discard processing of the received data from the subscribers based on the communication state and the congestion state.

BRIEF DESCRIPTION OF THE DRAWINGS

Embodiments of an asynchronous transfer mode (hereinafter called ATM) multiplexing apparatus and an ATM cell discard method of the present invention will be described in detail with reference to the accompanying drawings below.

DETAILED DESCRIPTION OF THE PREFERRED EMBODIMENTS

Figure 1:
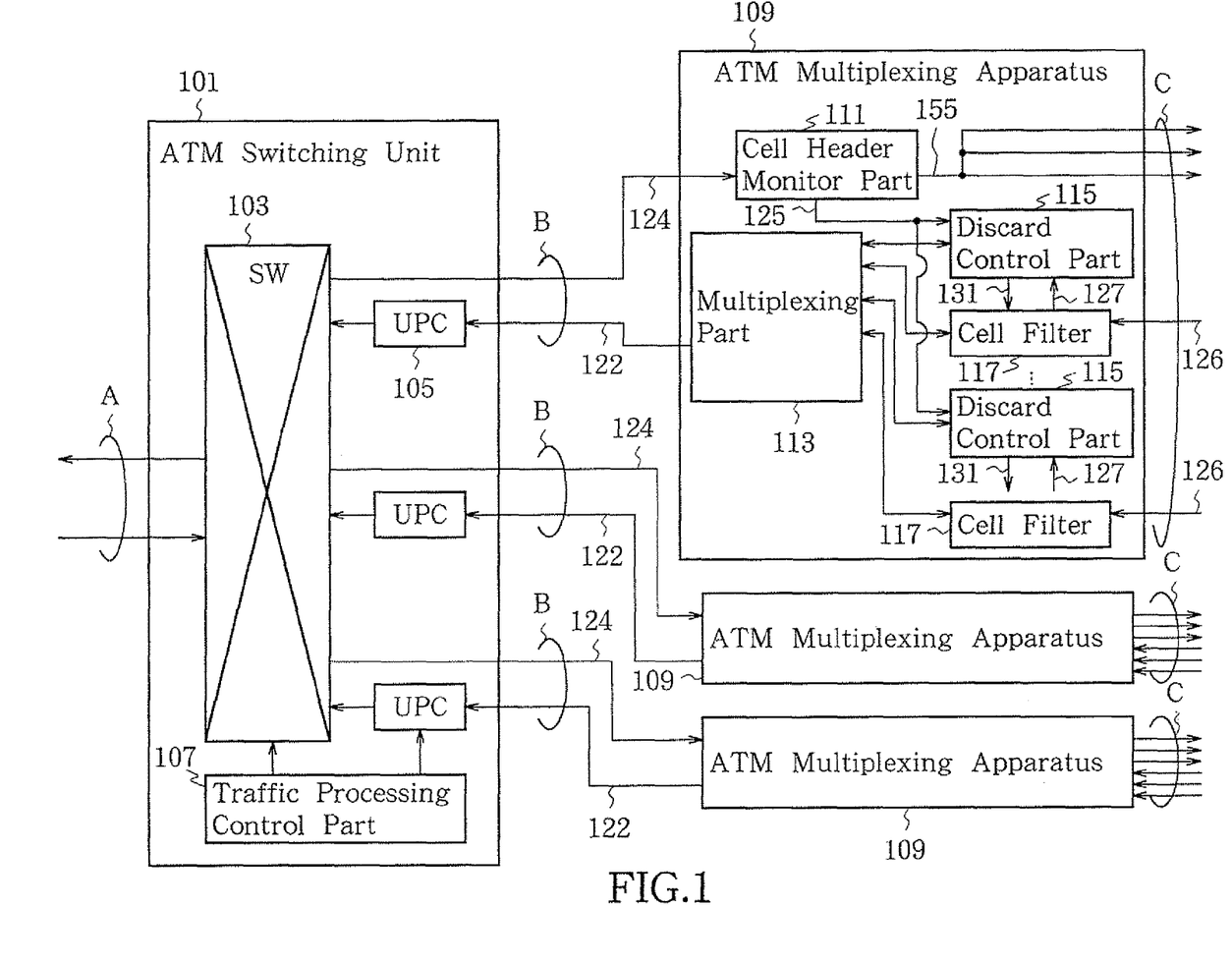
FIG. 1 is a block diagram illustrating an ATM network communication system according to the first embodiment of the present invention.

Referring to FIG. 1 which shows a block diagram of an ATM network communication system receiving ATM multiplexing apparatus of the present invention, this ATM network communication system comprises an ATM switching unit 101 and ATM multiplexing apparatus 109. The ATM switching unit 101 is arranged in a station. The ATM switching unit 101 is connected to ATM transmission lines (ATM communication lines) A.

The ATM switching unit 101 comprises a switch part 103, UPC (Usage Parameter Control) units 105, and a traffic processing control part 107. The switch part 103 switches the direction of signals (ATM cells) from subscribers. The switched signals are connected to an ATM network through the ATM transmission lines A. The UPC units 105 monitor whether multiplexing signals 112 from the ATM multiplexing apparatus 109 violate the contracted traffic or not. The traffic processing control part 107 responds to the signaling connection request (not shown) from the subscribers and performs connection processing of the requested connection.

The ATM multiplexing apparatus 109 are arranged in the side of the subscribers corresponding to the number of UPC units 105 provided in the ATM switching unit 101, and are connected to the ATM switching unit 101 through ATM transmission lines B and are connected to the signals (ATM cells) from the subscribers through ATM transmission lines C.

The ATM multiplexing apparatus 109 comprises a cell header monitor part (switching unit monitor means) 111, a multiplexing part 113, discard control parts (discard control means) 115, and cell filters (subscriber monitor/selection means) 117.

The cell header monitor part 111 monitors ATM cells transmitted from the side of the ATM switching unit to the side of the subscribers and acquires header information. The monitored ATM cells from the ATM switching unit are transmitted to the ATM transmission lines C as ATM cells (hereinafter called received ATM cells) 155 received from the ATM switching unit. Also, the cell header monitor part 111 outputs header information (first header information) and its received notification (first received notification) 125 acquired from the received ATM cells 155 from the ATM switching unit. The first header information includes a VPI (Virtual Pass Identifier) and a VCI (Virtual Channel Identifier).

The multiplexing part 113 performs multiplexing processing to ATM cells from the respective cell filters 117 and generates a multiplexing signal 112. The multiplexing part 113 detects a congestion state if the amount of retention of the received ATM cells from the subscribers exceeds the preset threshold. The detected congestion state is generated as a warning signal 129. The discard control part 115 pairs off with the cell filter 117 and they are provided corresponding to the number of subscribers.

The discard control part 115 updates status data 139 (as described in FIGS. 3 and 4 below) indicating a communication state on the basis of the first header information and the first received notification 125 from the cell header monitor part 111 or the second header information and the second received notification 127. Further, the discard control part 115 responds to the warning signal 129 from the multiplexing part 113, and decides whether the received ATM cells from the subscribers are discarded or not on the basis of a level value of the warning signal 129 and the updated status data, and generates a discard command 131 as the decision result.

Figure 2:
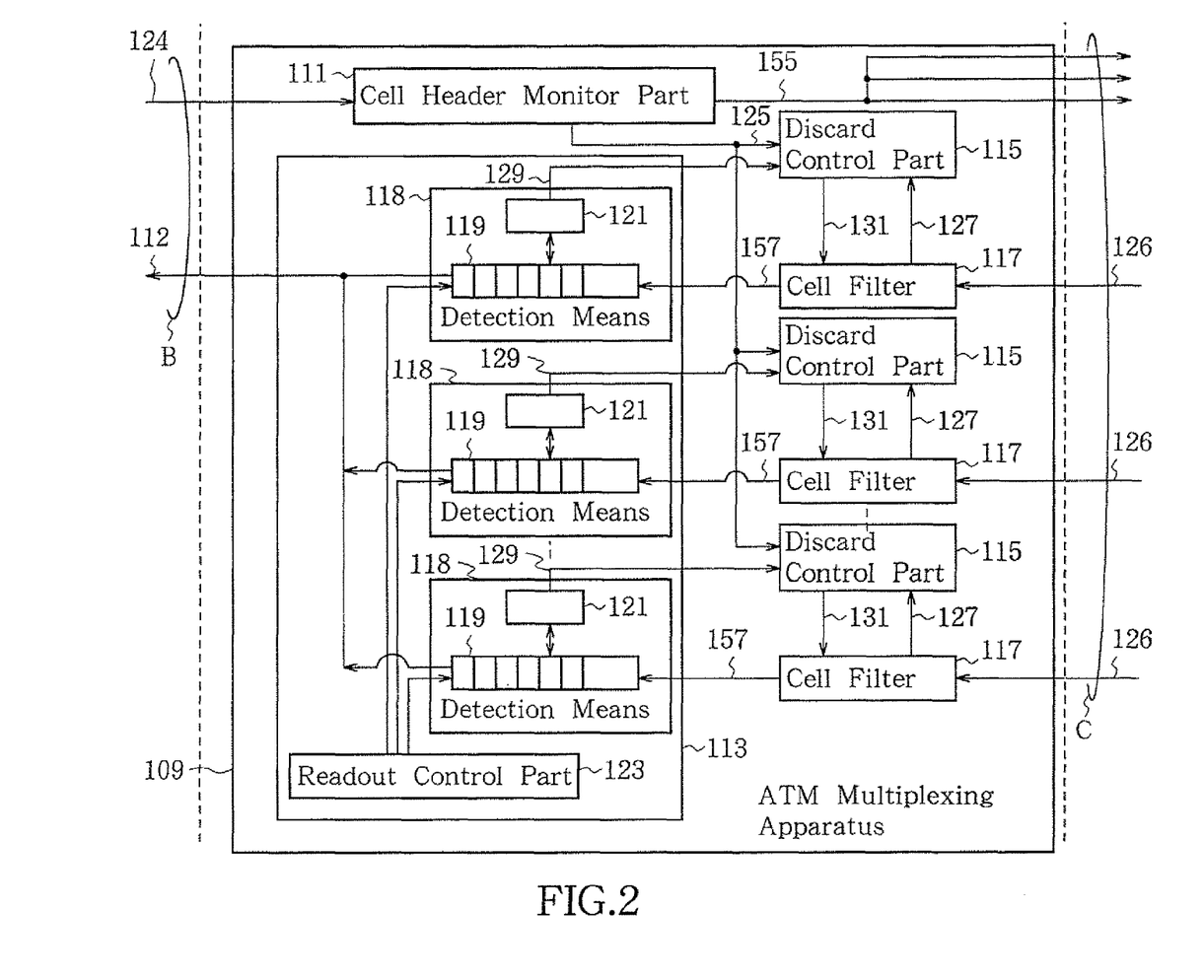
FIG. 2 is a block diagram illustrating an ATM multiplexing apparatus according to the first embodiment of the present invention.

The cell filter 117 monitors ATM cells 126 from the subscribers and acquires header information. The monitored ATM cells from the subscribers are temporarily stored in the cell filter 117 as ATM cells (hereinafter called received ATM cells) received from the subscribers (not shown). Also, the cell filter 117 outputs header information (second header information) and its received notification (second received notification) 127 acquired from the received ATM cells from the subscribers. The second header information includes a PTI (Payload Type Identifier) in addition to the VPI and the VCI. Moreover, the cell filter 117 discards the received ATM cells from the subscribers stored temporarily on the basis of the discard command 131 from the discard control part 115, or transfers (passes) the received ATM cells to the multiplexing part 113. FIG. 2 shows the received ATM cells 157' from the subscribers in the case of being transferred.

Thus, the ATM multiplexing apparatus 109 of the present invention selectively discards the received ATM cells from the subscribers. This selective discard processing is performed on the basis of the level value of the warning signal 129 from the multiplexing part 113 and the communication state. The communication state in this case indicates a use state of the same connection determined by the received ATM cells 155 from the ATM switching unit and the received ATM cells from the subscribers.

FIG. 2 shows a detailed block diagram of the ATM multiplexing apparatus 109 in the ATM network communication system of the present invention. The multiplexing part 113 comprises detection means 118 and a readout control part 123.

In the present embodiment, one detection means 118 is provided corresponding to a subscriber line (or a pair of the discard control part 115 and the cell filter 117). The detection means 118 comprises storage means 119 and comparison means 121.

The storage means 119 stores the received ATM cells from the subscribers. The comparison means 121 holds the preset threshold. The comparison means 121 generates the warning signal 129 on the basis of the degree of occupancy in the storage means 119 of the ATM cells stored in the storage means 119 and the preset threshold. The warning signal 129 provides the level value corresponding to the preset threshold. Also, the storage means 119 generates the warning signal 129 indicating a congestion state if the above degree of occupancy exceeds the preset threshold. As described below, if the threshold, for example, is set to "½", the warning signal 129 is generated as "0" or "1". Also, if a plurality of the thresholds, for example, are set to "⅝", "¾", and "⅞", the warning signal 129 provides the level values of "000", "001", "011" or "111". The readout control part 123 sequentially reads out the ATM cells stored in the respective storage means 119, and transmits the ATM cells to the ATM transmission lines B as the multiplexing signal 112. In the present invention, a readout control method is not limited.

Figure 3:
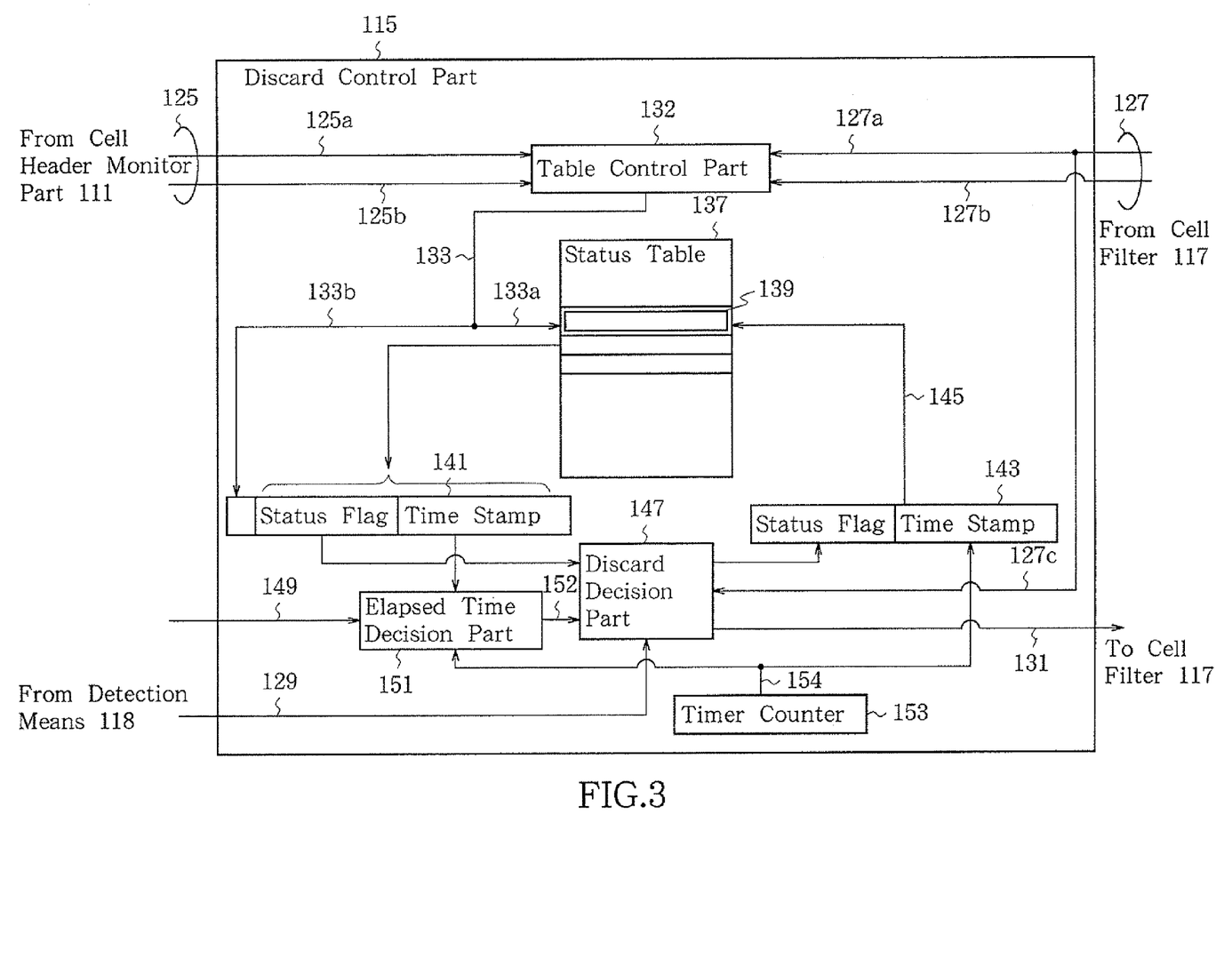
FIG. 3 is a block diagram illustrating a discard control part in the ATM multiplexing apparatus according to the first embodiment of the present invention

FIG. 3 shows a detailed block diagram of the discard control part 115 as indicated in FIG. 2. Referring to FIG. 3, the discard control part 115 comprises a table control part 132, a status table 137, a first register 141, a second register 143, a discard decision part 147, an elapsed time decision part 151, and a timer counter 153.

The table control part 132 responds to the first header information (VPI, VCI) 125a and the first received notification 125b or the second header information (VPI, VCI) 127a and the second received notification 127b, and generates a control signal 133. The control signal 133 is a signal for commanding updating of status data 139, and includes a directive signal 133a of the address corresponding to the first header information 125a or the second header information 127a and a sending end signal 133b. The sending end signal 133b provides a sending source indicating that the received ATM cells have been received from the side of either the ATM switching unit or the subscribers. Thus, the sending end signal 133b is a signal associated with either the first received notification 125b or the second received notification 127b.

Figure 4:
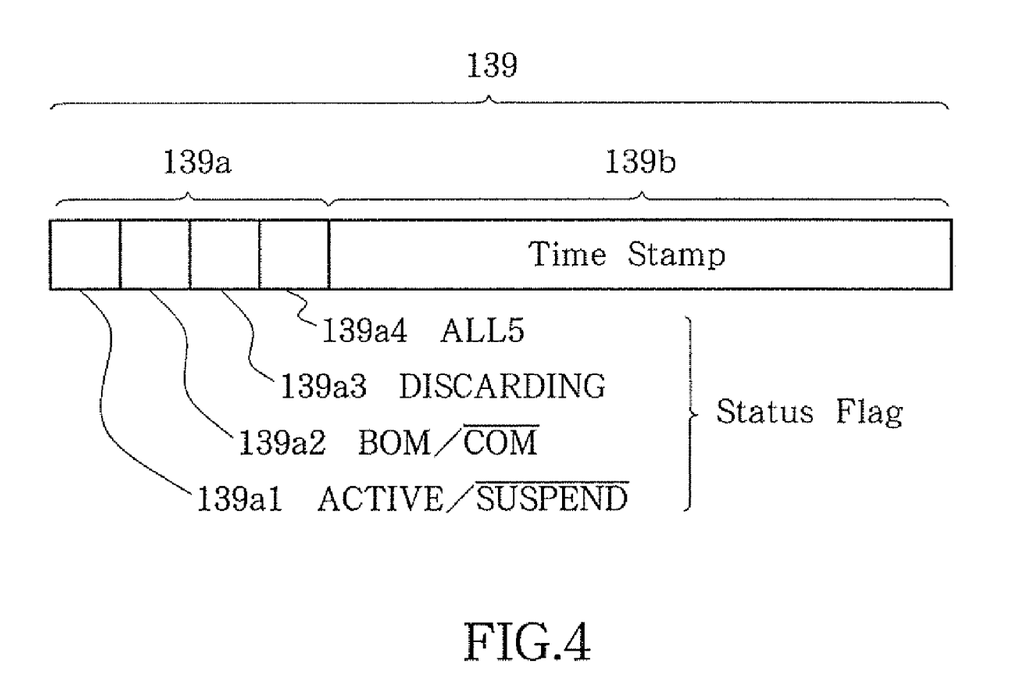
FIG. 4 is an illustration of the format of a status table in the ATM multiplexing apparatus according to the first and second embodiments of the present invention.

The status table 137 stores the status data 139 on the basis of the address corresponding to the first header information 125a or the second header information 127a. The format (the status data 139) of the status table 137 is shown in FIG. 4. The status data 139 provides the above-mentioned communication state. The status data 139 is formed of status flags 139a and received time (time stamp) 139b of the ATM cells from the ATM switching unit or the subscribers. Details of the status flags 139a are described below. Also, the status table 137 outputs the status data 139 corresponding to the address indicated by the directive signal 133a of the address as status data 135 using time division processing.

The first register 141 temporarily stores the status data 135 read out from the status table 137 and the sending end signal 133b. The second register 143 temporarily stores the status data updated by the discard decision part 147 and that time. The elapsed time decision part 151 calculates the elapsed time from the received time 139b to the present time 154. The received time 139b is included in the status data 135 read out responding to the control signal 133 (directive signal 133a of the address). The present time 154 is generated by the timer counter 153. A time interval of the timer counter 153 is the order of several hundreds of milliseconds to a second and may be set in apparatus unit. Further, the elapsed time decision part 151 compares the calculated elapsed time with a preset reference elapsed time 149. The elapsed time decision part 151 generates a time-out signal 152 if it is decided that the calculated elapsed time has exceeded the preset reference elapsed time 149. The preset reference elapsed time 149 is held in the elapsed time decision part 151 and is variably set from the outside.

The discard decision part 147 updates the readout status data 135 on the basis of the sending end signal 133b, the time-out signal 152 and the second header information (PTI) 127c using the sending end signal 133b (signal related to any of the first or second received notification) from the first register 141 and the readout status data 135, the time-out signal 152 from the elapsed time decision part 151 and further the second header information (PTI) 127c as input. In this update processing, each component of the status flags 139a in the status data 135 read out is updated on the basis of criteria of the state transition shown in FIG. 5. Moreover, the received time 139b in the status data 135 read out is updated by the present time from the timer counter 153. Each of the updated data is again stored in the status table 137 as the updated status data 145 through the second register 143. The criteria of the state transition will be described below. Further, the discard decision part 147 generates the discard command 131 on the basis of criteria of discard decision logic shown in FIG. 6 when the warning signal 129 indicating the congestion state is inputted in the case of the above update processing. The criteria of discard decision logic will be described below.

Incidentally, for convenience of description, the first and second registers (141 and 143), the discard decision part 147 and the elapsed time decision part 151 are individually shown in the present embodiment, but they are preferably integrated on one LSI (Large Scale Integration).

FIG. 4 shows the format of the status table 137 (status data 139). The status data 139 is formed of status flags 139a and received time (time stamp) 139b. Also, in this example, the status flags 139a are formed of connection data (ACTIVE/SUSPEND) 139a1, position data (BOM/COM) 139a2, discard data (DISCARDING) 139a3, and AAL data (AAL5) 139a4. The connection data (ACTIVE/SUSPEND) 139a1 indicates a two-way connection state of the same connection established by the received ATM cells 155 from the ATM switching unit and the received ATM cells from the subscribers. The position data (BOM/COM) 139a2 indicates the where the received ATM cells from the subscribers. are positioned in a packet signal corresponding to an ATM adaptation layer (AAL)5. "BOM" means Beginning Of Message of the packet signal, and "COM" means Continuation Of Message of the packet signal. The discard data (DISCARDING) 139a3 indicates whether cell discard processing constituting the packet signal corresponding to the ATM adaptation layer (AAL)5 is performed or not. The AAL data (AAL5) 139a4 indicates whether the received ATM cells 155 from the ATM switching unit and the received ATM cells from the subscribers constitute the packet signal corresponding to the above AAL5 or not.

Figure 5A:
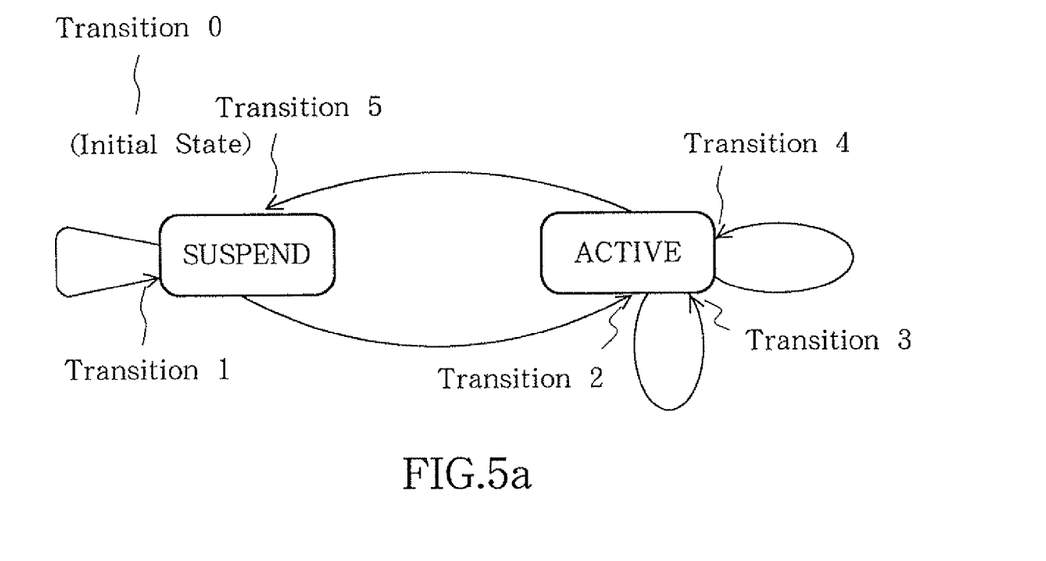
FIGS. 5A and 5B are conceptual diagrams illustrating a part of processing of the discard control part in the ATM multiplexing apparatus according to the first and second embodiments of the present invention.
Figure 5B:
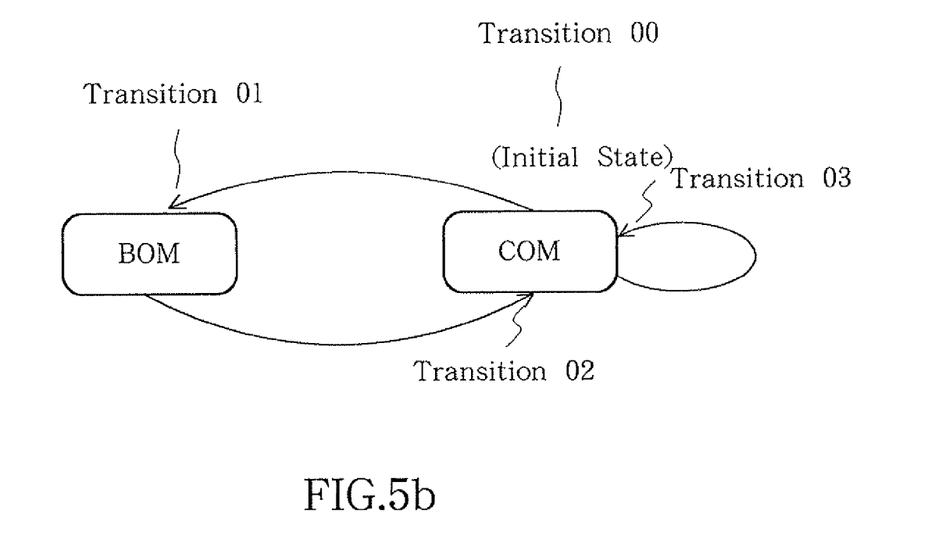

FIGS. 5A and 5B show diagrams of criteria of the state transition. The update processing in the discard decision part 147 as described above is performed on the basis of the criteria of the state transition. FIG. 5A provides the state transition of the connection data (ACTIVE/SUSPEND) 139a1. FIG. 5B provides the state transition of the AAL data (AAL5) 139a4.

Referring first to FIG. 5A, the discard decision part 147 sets a state (connection data 139a1) of the connection specified by cell information (VPI, VCI) of the received ATM cells from the subscribers to a "SUSPEND" state when a receiving end signal 133b related to the second received notification 127b is inputted (transition 0, including initial state). In the state of transition 0, the discard decision part 147 holds the state of the connection data 139a1 read out through the first register 141 with the "SUSPEND" state when the receiving end signal 133b related to the second received notification 127b is inputted (transition 1). In the state of transition 0, the discard decision part 147 updates the connection data 139a1 to an "ACTIVE" state when a receiving end signal 133b related to the first received notification 125b is inputted (transition 2). In the state of transition 2, the discard decision part 147 holds the connection data 139a1 with the "ACTIVE" state when the receiving end signal 133b related to the first received notification 125b is inputted (transition 3). In the state of transition 2, the discard decision part 147 performs processing based on a time-out signal 152 as shown below when the receiving end signal 133b related to the second received notification 127b is inputted. The discard decision part 147 holds the connection data 139a1 with the "ACTIVE" state when inputting only the receiving end signal 133b related to the second received notification 127b in the "ACTIVE" state (transition 4). Also, the discard decision part 147 updates the connection data 139a1 to the "SUSPEND" state when inputting the time-out signal 152 as well as the receiving end signal 133b related to the second received notification 127b in the "ACTIVE" state (transition 5).

Next, FIG. 5B will be described. When the packet signal corresponding to the AAL5 is divided into ATM cells, the least significant bit of a PTI field (3 bits) included in a cell header of the last cell is set to "1". Thus, the discard decision part 147 responds to cell information (PTI) 127c and updates AAL data 139a4 when the received ATM cells from the subscribers constitute the packet signal conforming to the AAL5. That is, the discard decision part 147 responds to the cell information (PTI) 127c providing "PTI=xx0" (where x is an arbitrary bit value) and sets the AAL data 139a4 to a "COM" state (transition 00, including initial state). In the state of transition 00, the discard decision part 147 responds to the cell information (PTI) 127c providing "PTI=xx1" and updates the AAL data 139a4 to a "BOM" state (transition 01). In the state of transition 01, the discard decision part 147 responds to the cell information (PTI) 127c providing "PTI=xx0" and updates the AAL data 139a4 to a "COM" state (transition 02). In the state of transition 02, the discard decision part 147 holds the AAL data 139a4 to a "COM" state when inputting the cell information (PTI) 127c providing "PTI=xx0" (transition 02)

The following two states may be detected by the state transition diagram of FIG. 5A.

The first state is the state in which cell input only from the subscribers is present and response cells from the ATM switching unit (ATM network side) are absent. This first state is the state in which abnormal conditions have occurred in subscriber terminals or flow control such as TCP/IP has not been performed in a high layer, and is a possibility of the unreliable connection in communication lines of only one way. In this case, input cells may be the abnormal cells or the unreliable connection. Thus, there is no serious problem even if the input cells are discarded in congestion. The second state is the state in which arrival intervals of the cells from the subscribers have elapsed longer than the preset time. That is, it is possible that the SVC connection is disconnected once and is switched to other connection.

The second state cannot continue the previous condition ("ACTIVE" state). Thus, the connection data 139a1 is updated to the "SUSPEND" state in order to again decide the state. Also, when the connection is not disconnected, it may be decided that there is the connection having low traffic density. For low traffic density, there is a little load on the ATM network even if the high layer executes resending after cell discard. Therefore, there is no serious problem even if discard processing is performed in congestion.

In the case where the received ATM cells from the subscribers constitute the packet signal corresponding to the AAL5, if one cell is discarded, all the packet signal is discarded in the high layer. When cell discard is carried out in a congestion state, packet discard technique for discarding the packet signal corresponding to the AAL5 except for the last cell is used. Hence, in the present embodiment, the communication state is managed using the technique in conjunction with the criteria of the state transition as shown in FIG. 5B. When the cell discard in the packet signal is carried out, the cells corresponding to the same packet signal and the same connection are discarded except for the last cell.

As described above, the ATM multiplexing apparatus 109 of the present invention manages the communication state on the basis of the criteria of the state transition as shown in FIGS. 5A and 5B. This sequentially updated communication state (status data 139) provides decision materials in the case of discard decision processing as described below.

Figure 6A:
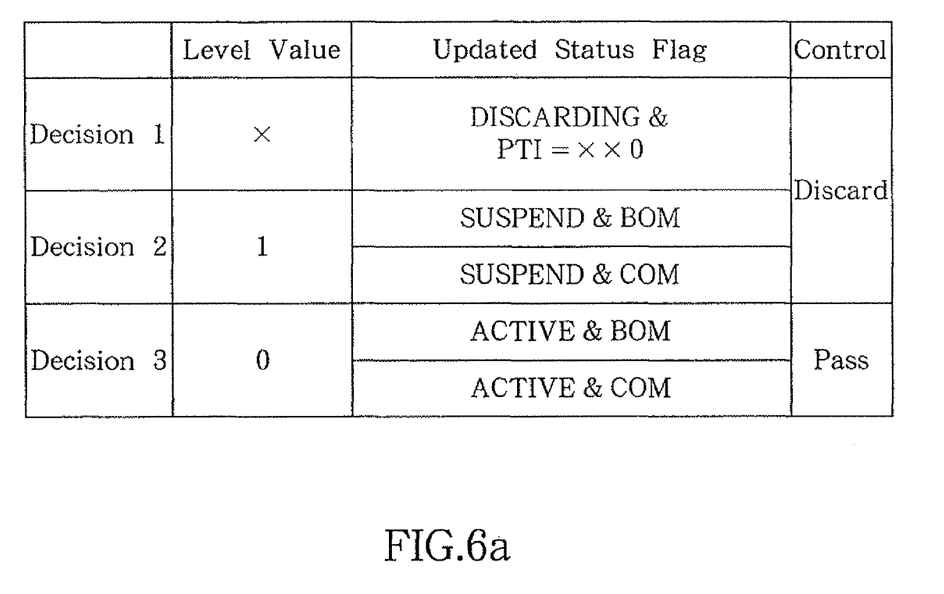
FIGS. 6A and 6B are conceptual diagrams illustrating a part of processing of the discard control part in the ATM multiplexing apparatus according to the first embodiment of the present invention.
Figure 6B:
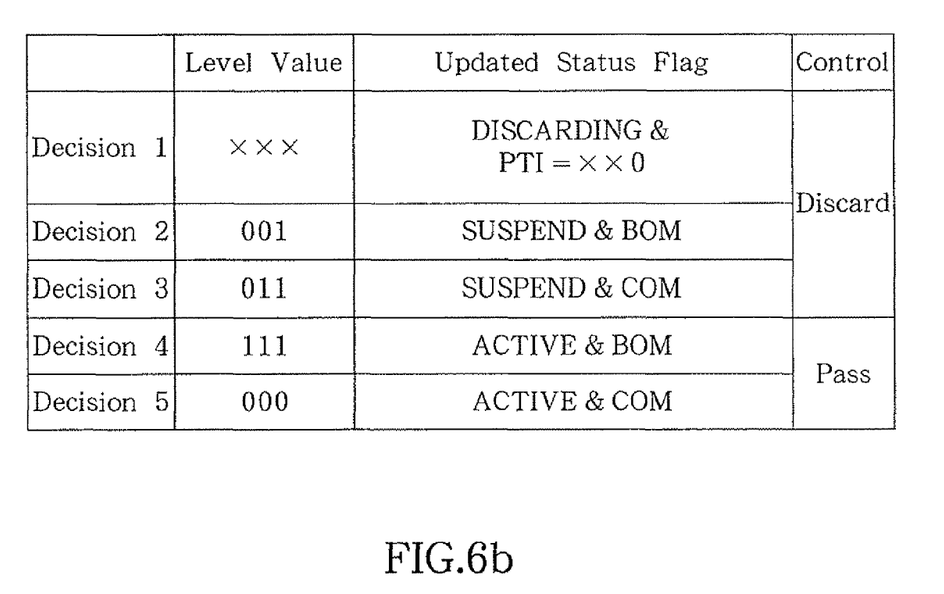

FIGS. 6A and 6B show criteria of discard decision logic. Here, the criteria of discard decision in the case that the level value of congestion given by a warning signal 129 is one kind and three kinds ("5/8", "3/4" and "7/8") is indicated. On the basis of this criteria, the discard decision part 147 performs the discard decision processing using the level value indicated by the warning signal 129 and the updated status flags as decision materials when the warning signal 129 indicating the congestion state is inputted.

Referring to FIG. 6A, decision 1 provides the decision in the case that discard data 139a3 after the state transition is "DISCARDING" and the received ATM cells from the subscribers is not the last cell ("PTI=xx0"). In this case, the discard decision part 147 generates the discard command 131 (for example, discard level "1") intended for the cells except the last cell in spite of the level value of the warning signal 129. When discard processing intended for the BOM cell or COM cell of the packet signal corresponding to the AAL5 is carried out, the discard data 139a3 is updated to a "DISCARDING" state. Also, when receiving the last cell (inputting the cell information (PTI) 127c providing "PTI=xx1"), the "DISCARDING" state is released. Decision 2 provides the decision in the case that the discard decision command 129 is "1" (congestion state) and the connection data 139a1 is a "SUSPEND" state. In this case, the discard decision part 147 generates the discard command 131 in spite of the position data 139a2.

Referring to FIG. 6B, decision 1' provides the decision in the case that discard data 139a3 is the "DISCARDING" state and the received ATM cells from the subscribers is not the last cell ("PTI=xx0"). In this case, the discard decision part 147 generates the discard command 131 in spite of the level value of the warning signal 129. Decision 2 provides the decision in the case of inputting the warning signal 129 giving the level value "001". In this case, the discard decision part 147 generates the discard command 131 when the connection data 139a1 is the "SUSPEND" state and the position data 139a3 is "BOM". At this time, the discard data 139a3 is updated to the "DISCARDING" state. Decision 3' provides the decision in the case of inputting the warning signal 129 giving the level value "011". In this case, the discard decision part 147 generates the discard command 131 when the connection data 139a1 is the "SUSPEND" state and the position data 139a3 is "COM". Decision 4' provides the decision in the case of inputting the warning signal 129 giving the level value "111". In this case, the discard decision part 147 generates the discard command 131 when the position data 139a2 is the "BOM" state even if the connection data 139a1 is the "ACTIVE" state. At this time, the discard data 139a3 is updated to the "DISCARDING" state.

The ATM multiplexing apparatus of the present invention takes communication of the packet signal corresponding to the AAL5 into consideration. The AAL5 is in the most use in data communication on an ATM network. As to a procedure, the initial value of the position data 139a2 of the received ATM cells constituting the packet signal corresponding to the AAL5 is set to the "COM" state. Next, responding to the second header information ("PTI=xx1") 127c, the position data 139a2 is updated to the "BOM" state. At this time, the AAL5 data 139a4 is set to "ON". Further, the discard data 139a3 is updated to the "DISCARDING" state only if the AAL5 data 139a4 is the "ON" state. Thus, the legality of packet discard processing is assured. Also, in the above discard processing, when the CBR traffic by an AAL1 flows, the position data 139a2 is held to the"COM" state. In this case, the cell discard processing is not performed since the AAL5 data is not updated to the "ON" state.

On the other hand, when detection means 109 in the ATM multiplexing apparatus 109 does not detect the congestion state, namely, output capacity in the case of applying multiplexing processing to an ATM signal from the subscribers is not more than output lines connected to the ATM switching unit, the UPC units 105 arranged in the input part of the ATM switching unit 101 monitor the traffic of contract violation in the output capacity after the multiplexing processing, and the input of abnormal cells due to abnormality of the subscriber terminals.

Figure 7:
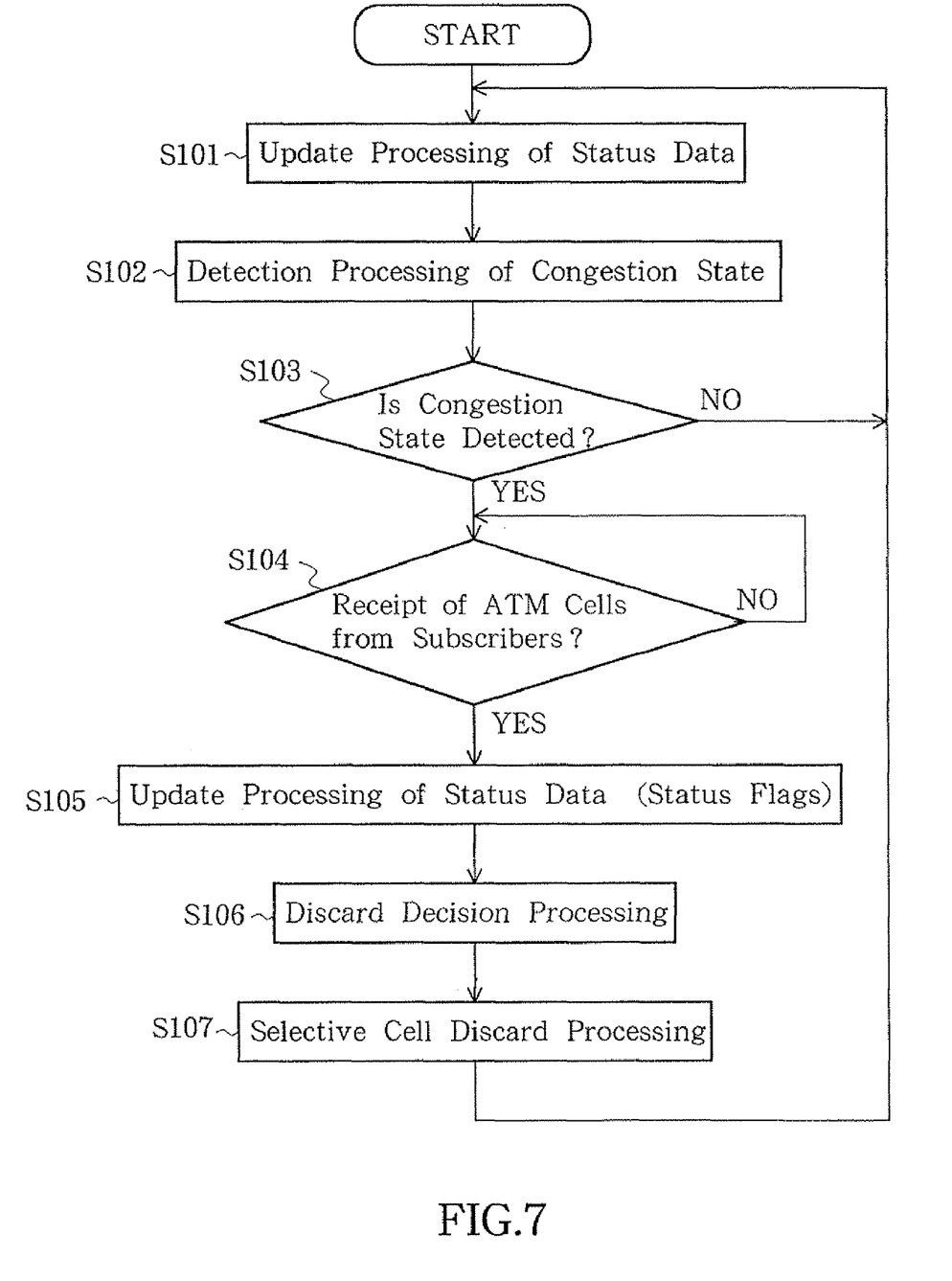
FIG. 7 is a flowchart illustrating operations of cell discard processing of the ATM multiplexing apparatus according to the first embodiment of the present invention.

FIG. 7 shows a flowchart illustrating a cell discard method of the ATM multiplexing apparatus according to the first embodiment of the present invention.

Referring to FIGS. 2 and 7, first, in step S101, update processing of status data 139 is executed. This update processing includes the received time 139. Also, the update processing responds to receipt of ATM cells 126 from the subscribers or ATM cells 124 from the ATM switching unit, and is sequentially performed on the basis of the criteria of the state transition shown in FIG. 5 as described above. Next, in step S102, detection processing of a congestion state of the received ATM cells from the subscribers is carried out. In this detection processing, the case that the congestion state is not detected is, for example, the case that the warning signal 129 providing the level value "0" in FIG. 6A as described above is inputted to the discard decision part 147. In this case, processing of step S101 is performed. Then, when the congestion state is detected in step S102, operation is shifted to update processing (step S105) of the status data 139 (status flags 139a) through receipt (monitor) processing (step S104) of the ATM cells 126 from the subscribers. Further, in step S104, the same update processing as step S101 is performed when receiving (monitoring) the ATM cells 124 from the ATM switching unit. After the update processing of step S105, in step S106, the discard decision part 147 decides whether a pair of data of the level value of the warning signal 129 and the updated status flags 139a correspond to any of the criteria of discard decision shown in FIGS. 6A and 6B as described above. In step S106, the discard decision part 147 generates the discard command 131 (for example, level value "1") when it is decided that a pair of data of the level value of the warning signal 129 and the updated status flags 139a correspond to any of the criteria of the preset discard decision logic. After generation of the discard command 131 (for example, level value "1"), the discard decision part 147 updates or holds the discard data 139a3 of the status flags 139a to "DISCARDING". Moreover, the discard decision part 147 updates the received time 139b to the present time 154 and stores them in the status table 137 as the status data 145. Then, in step S107, the cell filter 117 responds to the discard command 131 (for example, "1" or "0") and selectively discards the received ATM cells from the subscribers stored temporarily.

The ATM multiplexing apparatus 109 in the first embodiment of the present invention selectively discards the ATM cells flowing into the ATM network due to trouble etc. of the subscriber terminals in the case of congestion of the subscriber side. Since each header of the received ATM cells 155 from the ATM switching unit 101 (ATM network) is set by the traffic processing control part 107 of the ATM switching unit 101, header information of the received ATM cells 155 from the ATM switching unit is correct connection information. Among the received ATM cells from the subscribers, the received ATM cells having the header information different from the received ATM cells 155 from the ATM switching unit may highly be abnormal cells caused one-sidedly from the subscriber terminals, so that such cells are priority discarded. By the criteria of the preset discard decision logic, cell discard processing in the case of a short arrival interval of cells decreases in comparison with the case of a long receipt interval of cells, so that packet discard in the case of transmitting a large amount of data through TCP/IP etc. can be reduced. Also, in the cell discard processing in the present invention, connection setting information is unnecessary and it is unnecessary to dynamically receive to process actual connection information held by the ATM switching unit 101, so that control circuits in the ATM multiplexing apparatus can be configured at a low cost, thereby the ATM multiplexing apparatus itself can be configured at a low cost.

Figure 8:
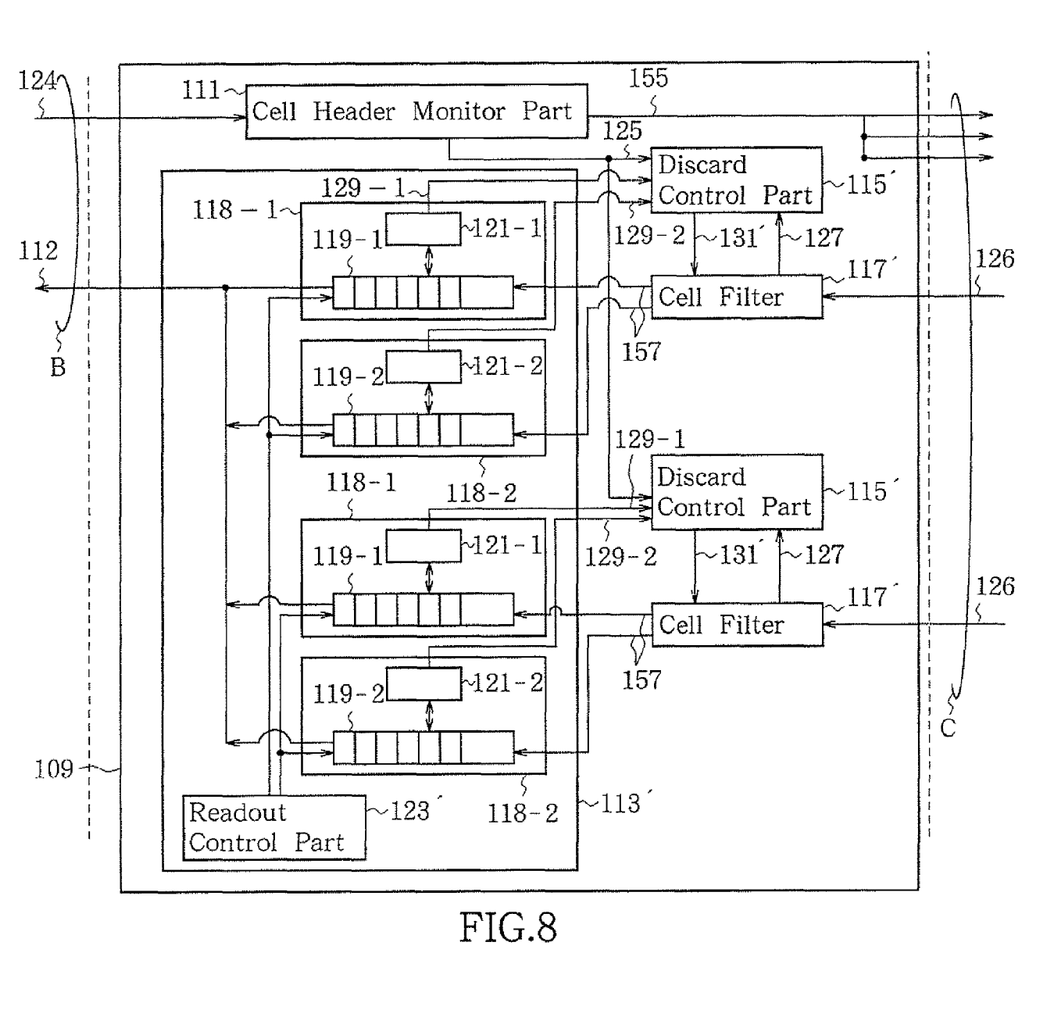
FIG. 8 is a block diagram illustrating an ATM multiplexing apparatus according to the second embodiment of the present invention.

Next, an ATM multiplexing apparatus and a cell discard method according to the second embodiment of the present invention will be described. FIG. 8 shows a block diagram of the ATM multiplexing apparatus according to the second embodiment of the present invention. Incidentally, by marking like reference characters on components having the same function as the above-mentioned first embodiment, description of the components is omitted.

Referring to FIG. 8, an ATM multiplexing apparatus 109 according to the present embodiment provides a plurality of detection means corresponding to subscriber lines. Priority related to storage of the received ATM cells from the subscribers is preset to each of a plurality of the detection means. In the present embodiment, two classes of the detection means (118-1, 118-2) are provided to one subscriber. Each of a plurality of the detection means (118-1 or 118-2) provides storage means (119-1 or 119-2) and comparison means (121-1 or 121-2). The storage means (119-1 or 119-2) stores the received ATM cells from the subscribers. Threshold corresponding to the priority is preset in the storage means. The comparison means (121-1 or 121-2) generates a warning signal (129-1 or 129-2) corresponding to the priority on the basis of the degree of occupancy in the storage means of the stored ATM cells and the preset threshold. The warning signal (129-1 or 129-2) provides the level value corresponding to the preset threshold. In the case of providing the storage means in which the priority is respectively set, a use state of the same connection managed by the status flags 139*a* can be utilized for priority decision. A readout control part 132 executes cell readout processing from the storage means 119-1 always taking higher priority than cell readout processing from the storage means 119-2.

Figure 9:
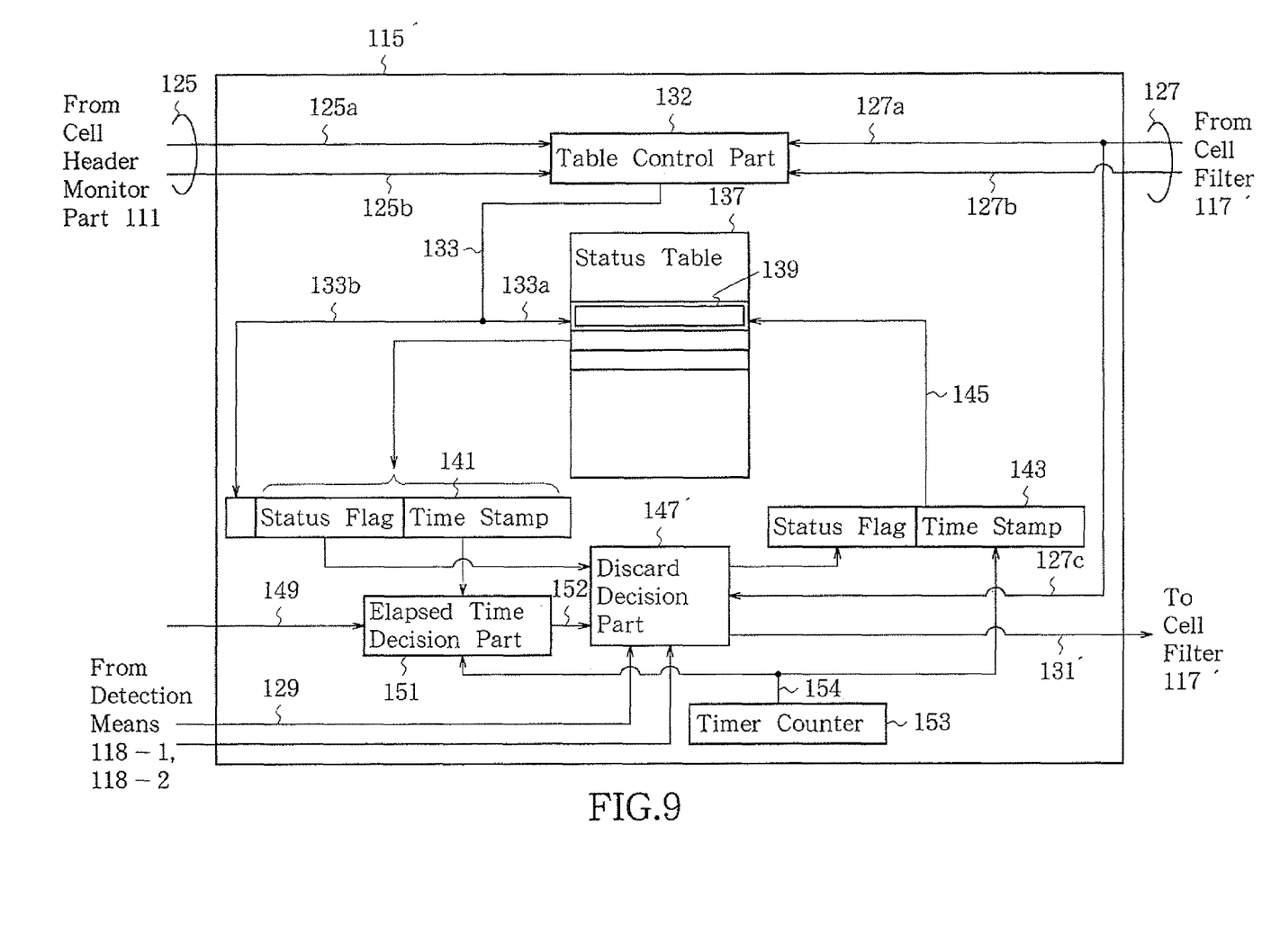
FIG. 9 is a block diagram illustrating a discard control part in the ATM multiplexing apparatus according to the second embodiment of the present invention

FIG. 9 shows a block diagram of a discard control part 115'. FIG. 9 corresponds to FIG. 3 in the above-mentioned first embodiment. The difference between FIG. 9 and FIG. 3 is that a discard decision part 147' inputs the warning signals (129-1, 129-2 shown in FIG. 9) generated from a plurality of the detection means (storage means). The discard decision part 147' performs discard decision processing on the basis of the level value indicated by the warning signals and the updated status data 139 (status flags) when inputting the warning signals (129-1, 129-2) indicating the congestion state. Update processing of the status data 139 is the same processing as the above-mentioned first embodiment.

Figure 10:
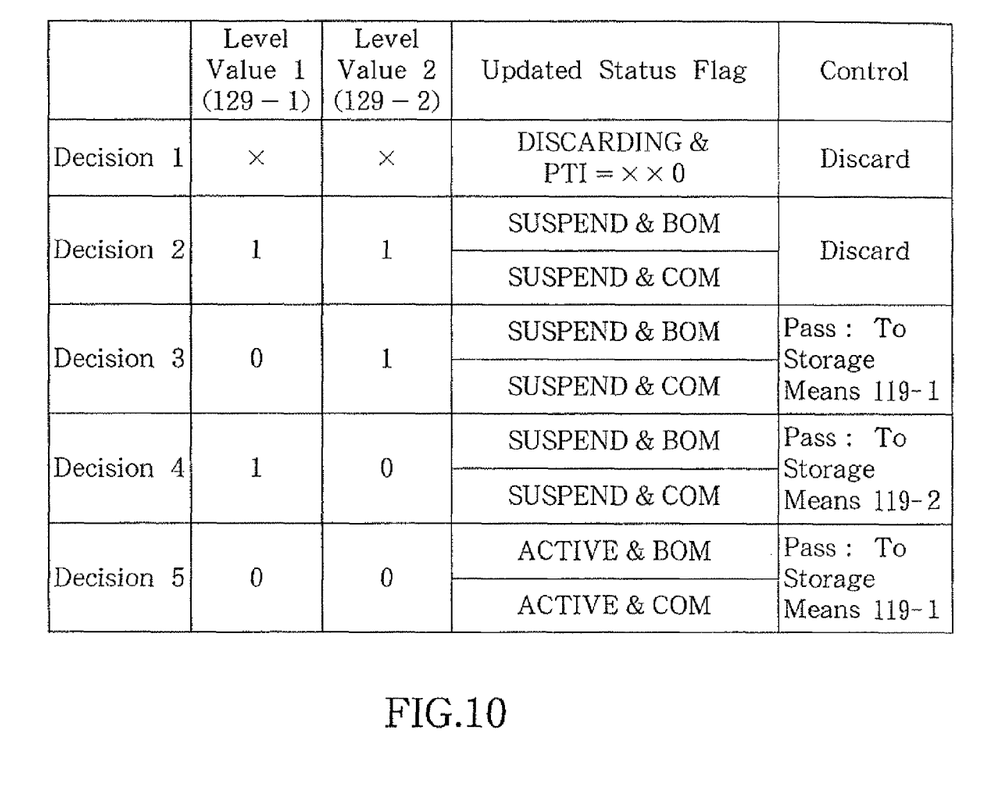
FIG. 10 is a conceptual diagram illustrating a part of processing of the discard control part in the ATM multiplexing apparatus according to the second embodiment of the present invention.

The discard decision processing is performed on the basis of criteria of discard decision logic shown in FIG. 10. The criteria shown in FIG. 10 is construed as the decision criteria in the case of inputting the warning signal 129 (level value) of FIG. 6B in the above-mentioned first embodiment to the discard decision part 147 simultaneously.

Referring to FIG. 10, decision 1" provides the decision in the case that discard data 139*a*3 after the state transition is "DISCARDING" and the received ATM cells from the subscribers is not the last cell ("PTI=xx0"). In this case, the discard decision part 147' generates the discard command 131' (discard level "1") intended for the cells except the last cell in spite of the level values of the warning signals 129-1 and 129-2. Next, decision 2" provides the decision in the case that each of the level values of the warning signals 129-1 and 129-2 is "1" (congestion state) and the connection data 139*a*1 is a "SUSPEND" state. In this case, the discard decision part 147' generates the discard command 131' (discard level "1") in spite of the position data 139*a*2. Further, decision 3" provides the decision in the case that each of the level values of the warning signals 129-1 and 129-2 gives "0" and "1". In this case, the discard decision part 147' generates the discard command 131' (pass level "0") when the connection data 139*a*1 is the "SUSPEND" state in spite of the position data 139*a*3. This discard command 131' includes indication of the target storage (storage means 119-1). Moreover, decision 4" provides the decision in the case that each of the level values of the warning signals 129-1 and 129-2 gives "1" and "0". In this case, the discard decision part 147' generates the discard command 131' (pass level "0") when the connection data 139*a*1 is the "SUSPEND" state in spite of the position data 139*a*3. This discard command 131' includes indication of the target storage (storage means 119-2). Further, decision 5" provides the decision in the case that each of the level values of the warning signals 129-1 and 129-2 gives "0". In this case, the discard decision part 147' generates the discard command 131' (pass level "0") when the connection data 139*a*1 is the "ACTIVE" state in spite of the position data 139*a*3. This discard command 131' includes indication of the target storage (storage means 119-1).

A cell filter 117' responds to the discard command 131' from the discard decision part 147' and selectively performs the cell discard processing. Also, the cell filter 117 transfers the received ATM cells 157 from the subscribers to the storage means 119-1 or 119-2 indicated by the discard command 131'.

By the ATM multiplexing apparatus according to the present embodiment, the cell discard processing with the amount of discard reduced is implemented. Also, by setting the level values of the congestion state different each other, discard processing of the packet signal corresponding to the AAL5 may also be used in the same manner as the above-mentioned first embodiment.

Incidentally, the present invention is not limited to the criteria of state transition and the criteria of discard decision logic (content of decision items) defined in the above-mentioned first and second embodiments, and the criteria are preset variably.

As described above, the ATM multiplexing apparatus according to the present invention implements selective discard processing to the received ATM cells from the subscribers in the case of congestion. By managing a use state of the connection on the basis of information easily acquired from the received ATM cells from the subscribers and the received ATM cells from the ATM switching unit, the selective discard processing is performed.

What is claimed is:

1. A device comprising:
    a first monitor component to obtain information from header fields of data packets received from a switch;
    a second monitor component to obtain information from header fields of data packets received from a subscriber;
    a discard control component to maintain communication state information, of the first monitor component and the second monitor component, where the communication state information includes status flags representing connection data, position data, discard data, and ATM adaptation layer (AAL) data, associated with each of the data packets, and where the communication state information further includes a time stamp associated with each of the data packets; and
    a detection component including:
        a queue for storing the data packets from the subscriber, and
        a comparison component to obtain congestion level information corresponding to an amount of congestion of the queue,
    where the discard control component selectively discards the data packets received from the subscriber based on the congestion level information and the communication state information.

2. The device of claim 1, where the device includes a plurality of discard control components and detection components, the plurality of discard control components and detection components being arranged such that one control component and one detection component are assigned to each of a plurality of subscribers.

3. The device of claim 2, further comprising:
    a multiplexing component to receive data packets from the plurality of discard control components and to transmit a multiplexed version of the data packets to the switch.

4. The device of claim 1, where the comparison component obtains the congestion level information by comparing a degree of occupancy of the queue to a threshold.

5. The device of claim 4, where the threshold is one of a plurality of thresholds corresponding to different congestion levels of the queue.

6. A method comprising:
    receiving switch data packets, from a switching unit, at a first monitor component that is to obtain switch information from header fields of the received switch data packets;
    receiving subscriber data packets, from subscribers, at a second monitor component that is to obtain subscriber information from header fields of the received subscriber data packets;

detecting, based on the obtained subscriber information, congestion state information associated with the received subscriber data packets;

maintaining communication state information based on the obtained switch information and the obtained subscriber information, where the communication state information includes status flags representing connection data, position data, discard data, and ATM adaptation layer (AAL) data, associated with each of the received switch data packets and each of the received subscriber data packets, and where the communication state information further includes a time stamp associated with each of the received switch data packets and each of the received subscriber data packets; and selectively performing discard processing of the received subscriber data packets based on the communication state information and the congestion state information.

7. The method of claim 6, further comprising:
storing the data packets from a first of the subscribers in a queue; and
determining the congestion state information based on a congestion value corresponding to an amount of congestion of the queue.

8. The method of claim 7, further comprising:
obtaining the congestion value by comparing a degree of occupancy of the queue to a threshold.

9. The method of claim 8, where the threshold is one of a plurality of thresholds corresponding to different amounts of congestion of the queue.

10. A device comprising:
means for receiving switch data packets, from a switching unit, at a first monitor component that is to obtain switch information from header fields of the received switch data packets;

means for receiving subscriber data packets, from subscribers, at a second monitor component that is to obtain subscriber information from header fields of the received subscriber data packets and detecting, based on the obtained subscriber information, congestion state information associated with the received subscriber data packets;

means for maintaining communication state information based on the obtained switch information and the obtained subscriber information, where the communication state information includes status flags representing connection data, position data, discard data, and ATM adaptation layer (AAL) data, associated with each of the received switch data packets and each of the received subscriber data packets, and where the communication state information further includes a time stamp associated with each of the received switch data packets and each of the received subscriber data packets; and means for selectively performing discard processing of the received subscriber data packets based on the communication state and the congestion state information.

11. The device of claim 10, further comprising:
means for storing the received subscriber data packets in a queue; and
means for determining the congestion state information based on a congestion value corresponding to an amount of congestion of the queue.

12. A system comprising:
a switching unit for connecting a plurality of subscribers to a network; and
a multiplexing device including:
a data packet header monitor component to maintain first communication state information, of data packets sent from the switching unit, where the first communication state information includes status flags representing connection data, position data, discard data, and ATM adaptation layer (AAL) data, associated with each of the data packets received from the switching unit;
a cell filter component to maintain second communication state information, of data packets sent from a first of the plurality of subscribers, where the second communication state information includes status flags representing one or more of connection data, position data, discard data, and ATM adaptation layer (AAL) data, associated with each of the data packets received from the first of the plurality of subscribers;
a detection component to obtain a congestion level corresponding to an amount of congestion of a queue corresponding to the first of the plurality of subscribers; and
a discard component to selectively discard data packets received from the first of the plurality of subscribers based on the congestion level, the first communication state information, and the second communication state information.

13. The system of claim 12, where the multiplexing device includes a cell filter component for each of the plurality of subscribers.

14. The system of claim 13, further comprising:
a multiplexing component to receive data packets from the plurality of cell filter components and to transmit a multiplexed version of the data packets to the switching unit.

15. The system of claim 12, where the detection component obtains the congestion level based on a comparison of the amount of congestion to a threshold.

* * * * *